H. C. FAIRCHILD.
VEHICLE SIGNAL.
APPLICATION FILED FEB. 27, 1917.
1,267,751.
Patented May 28, 1918.
2 SHEETS—SHEET 1.
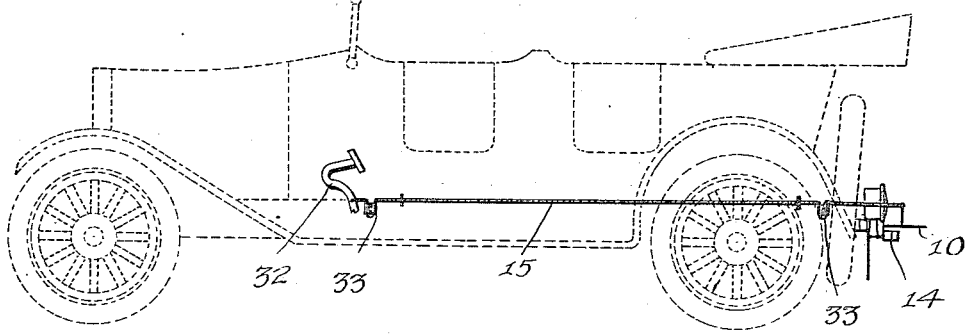
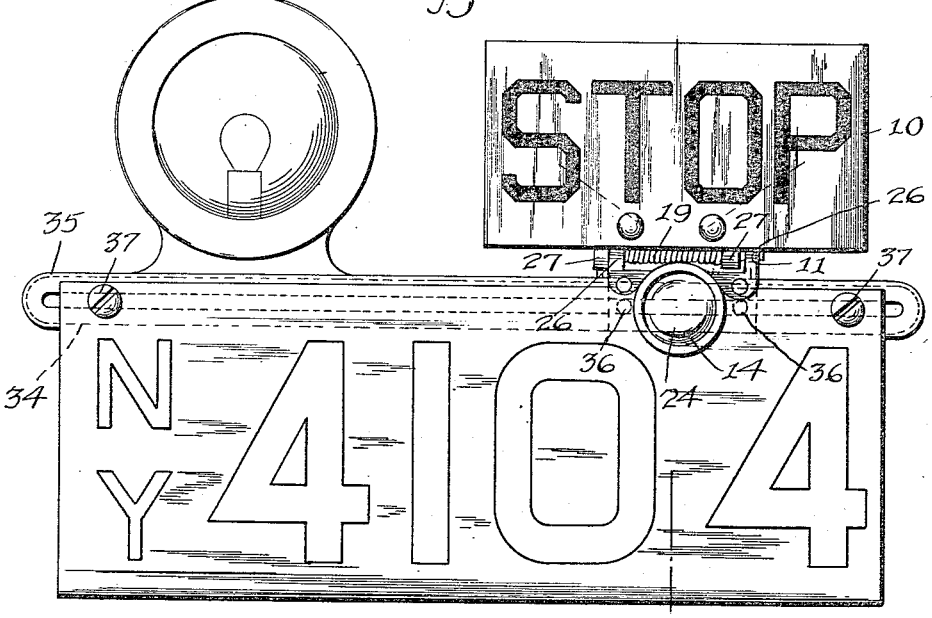

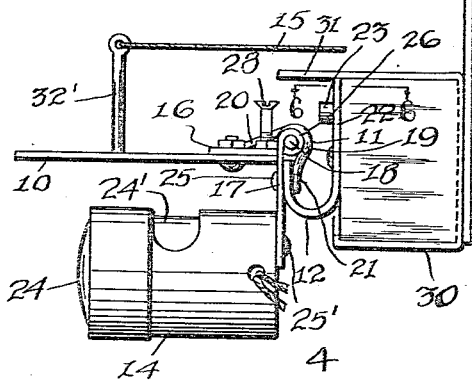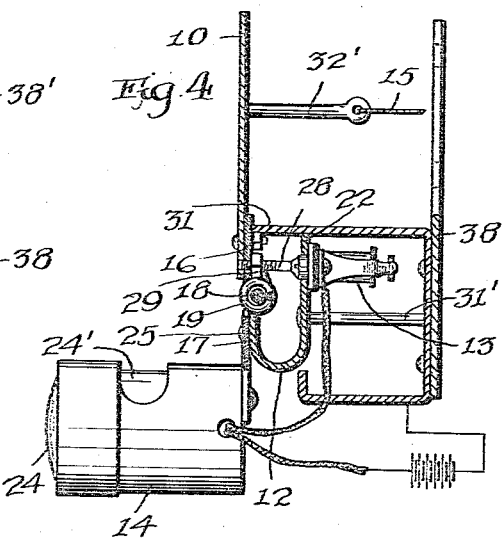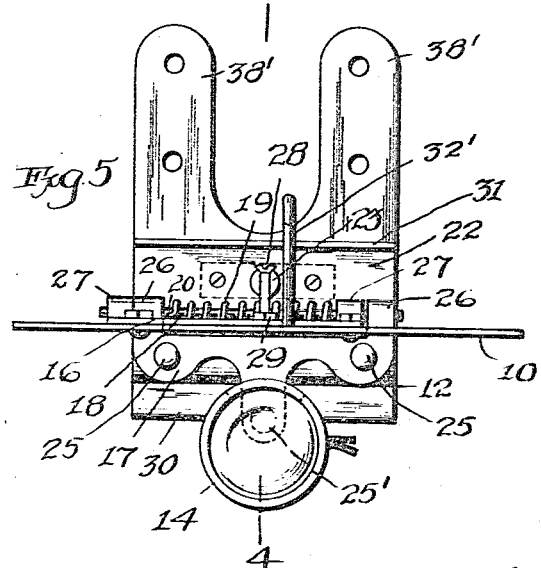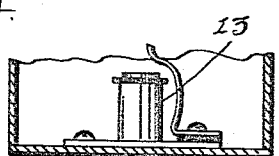

UNITED STATES PATENT OFFICE.

HARRY C. FAIRCHILD, OF MAPLEWOOD, NEW JERSEY.

VEHICLE-SIGNAL.

1,267,751.  Specification of Letters Patent.  Patented May 28, 1918.

Application filed February 27, 1917. Serial No. 151,221.

*To all whom it may concern:*

Be it known that I, HARRY C. FAIRCHILD, a citizen of the United States, residing at Maplewood, in the county of Essex and State of New Jersey, have invented a new and useful Vehicle-Signal, of which the following is a specification.

My invention relates to an improvement in vehicle signals operable in response to movement of the brake lever of the vehicle, more particularly of a motor driven vehicle, and preferably in conjunction with the customary or standard rear license number bracket of the vehicle, and the objects of my invention are, (1) to provide a vehicle signal which in response to the application of the brake assumes a position of display and on release of the brake assumes a neutral or non-display position, (2) to provide a vehicle signal which in response to application of the brake assumes, when used at night, a position of illuminated display and on release of the brake assumes an unilluminated or non-display position, (3) and to provide a vehicle signal of few and uncomplicated parts, cheap to manufacture and easy to install.

To the accomplishment of the above recited objects and others of a similar nature my invention consists in the construction, combination and arrangement of parts set forth in and falling within the scope of the appended claims. And it should be understood that I do not confine myself to all the precise details of construction, as there may be modification and variation in certain respects without departing from the spirit of my invention or exceeding the scope of the claims.

I attain these objects by the device illustrated in the accompanying drawings in which—

Figure 1, is a side view of an automobile with my vehicle signal attached thereto.

Fig. 2, is a front view of my vehicle signal attached to the rear license number bracket of an automobile.

Fig. 3, is a side elevation of my vehicle signal, the warning member being in horizontal position.

Fig. 4, is a sectional view on the line 4—4 of Fig. 5, the warning member being in vertical position.

Fig. 5, is a front elevation of my vehicle signal.

Fig. 6, is a sectional view of the electric switch on the line 6—6 of Fig. 3.

Figs. 7 and 8, are views of a clip for taking up slack.

My vehicle signal comprises in its main elements a warning member, 10, a double leaved spring controlled hinge, 11, a U-shaped bracket, 12, an electric switch, 13, and electric lamp, 14, and a pull or connection member, 15.

The warning member, 10, is of plate form, preferably of metal, and has on its face the word "Stop" or any preferred word suitable for warning.

The hinge, 11, comprises two leaves, 16 and 17, termed by me for purposes of description upper and under leaves, connected by ears, 26 and 27, to an axis, 18, around which axis a helix spring, 19, is arranged having extended ends, 20 and 21, to engage respectively the upper leaf, 16, and the under leaf, 17, the helix spring, 19, tending to keep the leaves 16 and 17, together or closed The warning member, 10, is attached at its lower edge by suitable means to the upper leaf, 16, of the hinge, 11, to permit the warning member, 10, to move with the upper leaf, 16, to a vertical or to a horizontal position.

The U-shaped bracket, 12, is attached to the under leaf, 17, of the hinge, 10, by bolts, 25, one portion or branch, 22, being extended upward, to which portion or branch, 22, the electric switch, 13, is attached in such manner that the button or push member, 23, of the switch when in normal position extends through a hole or aperture in the portion or branch, 22, to engage a rearwardly extending projection on the upper leaf of the hinge, 11, which is hereinafter more fully described. The switch, 13, is suitably electrically connected with the electric lamp, 14.

The electric lamp, 14, is provided with two lenses or glasses, 24 and 24', and is attached at its rear end to the hinge, 11, by a bolt 25', to the under leaf, 17, of the hinge so that the light from the lens, 24, will act as an additional tail light for the vehicle while the light from the lens, 24', illuminates the warning member, 10.

The upper leaf, 16, of the hinge, 11, is provided at its rear with a rearwardly extending contact projection or contact screw, 28, engaging at its threaded end a threaded hole in the upper leaf, 16, of the hinge to permit the screw, 28, to be so adjusted as to allow its head to engage the button or push member, 28, of the electric switch, 13, to operate the switch to light the electric lamp, 14, when the warning member, 10, and upper leaf, 16, are raised to a position to make the contact between the head of the screw, 28, and the switch, 13. The warning member, 10, and the upper leaf, 16, of the hinge, 11, being connected and moving together the screw, 28, is thus operable with the warning member. The contact screw, 28, has a lock nut, 29, to hold it in proper adjustment. The adjustable feature of the contact means or screw, 28, permits making an early or late contact with the switch, 13, and a consequent early or late illumination of the warning member, 10. Thus if desirable the screw, 28, may be set so that the warning member, 10, will be illuminated for an extended period before it reaches the final vertical position of illumination, the effect being of an early and continued illumination of the warning member, or the screw, 28, may be set for a short period of illumination before the warning member reaches the final vertical position of illumination, the first effect being of a sudden or flash illumination of the warning member.

A weather case, 30, substantially rectangular in shape open at the front is provided for my device, the top of which is extended forwardly to afford a stop, 31, for the warning member, 10, and upper leaf, 16, of the hinge, 11, when they are in a vertical position, that is, to prevent the warning member and upper leaf of the hinge from being drawn beyond a vertical position by the strain of the pull member or connection, 15. The weather case, 30, is supported by the U shaped bracket, 12, by means of a bolt 31', or bolts 31', extending from the branch, 22, of the bracket to the back of the weather case, 30.

The pull member or connection, 15, is preferably a cable and is suitably fastened at one end to the speed controlling lever, such as the clutch lever or the brake lever or pedal brake lever, 32, of an automobile or other vehicle and at the other end to a rod, 32', attached to the rear side of the warning member, 10, the purpose of the rod, 32', being to afford clearance of the top of the weather case, 30, and also to permit the warning member more readily to be raised to a vertical position. Any slack of the pull member or connection, 15, is taken up by clips, 33, Figs. 7 and 8. As a means for attaching my device to the usual or standard rear license number bracket of an automobile or other vehicle I provide a slotted bracket, 34, shown in outline, Fig. 2.

The slotted bracket, 34, is adjustably attachable to the slotted portion, 35, of the rear license number bracket of an automobile or other vehicle by screws, 36, passing through the lower portion of the back of the weather case, 30, and the slotted bracket, 34, is adjustably attachable to the slotted portion, 35, of the license number bracket by the same screws, 37, as connect the slotted portion, 35, and the license number bracket to each other, the slot feature of the bracket, 34, permitting the shifting of my device to right or left on the license number bracket to a desired position. Or the slotted bracket, 34, may be attached to the slotted portion, 35, by the bolts, 25, of the under leaf of the hinge, 17.

As a modified form for attachment of my device to the rear of an automobile or other vehicle, I provide a bifurcated plate, 38, which is attachable by screws at its lower portion to the back of the weather case, 30, the bifurcations or ears, being provided with screw holes to atttach the plate, 38, to the rear of an automobile or other vehicle. The plate, 38, is bifurcated to provide clearance space for the pull connection, 15. If desirable my device may be attached by the bolts, 25, through the under leaf of the hinge, 17, to the rear of the vehicle or to the slot, 35, of the rear license number bracket.

The operation of my vehicle signal is as follows: The device having been attached to the rear of an automobile or other vehicle and the pull connection, 15, clutch lever, brake lever or pedal brake lever, 32, and warning member, 10, being connected operation of the clutch lever, brake lever or pedal lever, 32, will raise the warning member, 10, and upper leaf, 16, of the hinge, 11, to a vertical position, the warning member, 10, and upper leaf, 16, of the hinge, 11, being held vertically by the stop, 31, and in position of display. Release of the clutch lever, brake lever or pedal brake lever, 32, will permit the warning member, 10, to return to a horizontal position, or non-display, through action of the spring, 17.

The electric switch, 13, lamp, 14, and weather case, 30, having been suitably electrically connected with the electric means for lighting of an automobile or other vehicle, operation of the clutch lever or brake lever or pedal brake lever, 32, will raise the warning member, 10, and upper leaf, 16, of the hinge, 11, to a vertical position, the contact member, 28, being suitably adjusted will engage the switch, 13, to complete the electric circuit to light the lamp, 14, the light from the lens, 24', illuminating the warning member, 10, and the light from the lens, 24, providing an additional temporary tail light when my device is used at night, the color of the lenses 24 and 24', preferably being red as the most effective for the purpose. Release of the clutch lever or brake lever or pedal brake lever, 32, through action of the spring, 17, will cause disengagement of the contact member, 28, to break the electric circuit and extinguish the lamp, 14, and will return the warning member, 10, to a position of non display.

I claim:—

1. A motor vehicle signal comprising, with means for attachment to the rear of a motor vehicle, a hinge having an upper and an under leaf pivoted upon an axis, a warning member operable with the upper leaf of the hinge to a vertical or to a horizontal position, contact means to stop the warning member in a vertical position, a spring with tension to hold the upper leaf of the hinge and warning member in a horizontal position, a contact member operable with the warning member to engage an electric switch, a bracket attached to the under leaf of the hinge and having an extension with an electric switch thereon engageable with said contact member, electric means to illuminate the warning member when the same is in a raised position, means for electrically connecting said electric switch and said electric means of illumination, and a pull connection to raise the warning member and to provide contact between the contact member and the electric switch or to lower the warning member and to break said contact.

2. A motor vehicle signal comprising, with means for attachment to the rear of a motor vehicle, a hinge having an upper and an under leaf pivoted upon an axis, a warning member operable with the upper leaf of the hinge to a vertical or to a horizontal position, contact means to stop the warning member in a vertical position, a spring with tension to hold the upper leaf of the hinge and warning member in a horizontal position, an adjustable contact member operable with the warning member to engage an electric switch, a bracket attached to the under leaf of the hinge and having an extension with an electric switch thereon engageable with said contact member, electric means to illuminate the warning member when the same is in a raised position, means for electrically connecting said electric switch and said electric means of illumination, and a pull connection to raise the warning member and to provide contact between the contact member and the electric switch or to lower the warning member and to break said contact.

3. A motor vehicle signal comprising, with means for attachment to the rear of a motor vehicle, a hinge having an upper and an under leaf pivoted upon an axis, a warning member attached to the upper leaf of the hinge and movable therewith to a vertical or to a horizontal position, a spring arranged around said axis with tension to hold the upper leaf of the hinge and warning member in a horizontal position, a contact member attached to the upper leaf of the hinge and operable with the warning member and adjustably engageable with an electric switch, a U-shaped bracket attached to the under leaf of the hinge and having an upward extension with an electric switch thereon engageable with said contact member, electric means to illuminate the warning member when the same is in a raised position, a weather case attached to the U-shaped bracket having the top extended to provide a stop for the upper leaf of the hinge and warning member in a vertical position, means for electrically connecting said electric switch and said electric illuminating means, a rod attached to the rear side of the warning member, and a pull connection attached to said rod to raise the warning member and to provide contact between the contact member and the electric switch or to lower the warning member and to break said contact.

HARRY C. FAIRCHILD.